June 13, 1961 J. DE KONING 2,988,200
MATERIAL DISTRIBUTING DEVICE
Filed Jan. 29, 1959 5 Sheets-Sheet 3

INVENTOR.
JACOB DE KONING
BY: Cushman, Darby & Cushman
ATTORNEYS

United States Patent Office 2,988,200
Patented June 13, 1961

2,988,200
MATERIAL DISTRIBUTING DEVICE
Jacob de Koning, Geleen, Netherlands, assignor to Stamicarbon N.V., Heerlen, Netherlands
Filed Jan. 29, 1959, Ser. No. 789,815
Claims priority, application Netherlands Jan. 31, 1958
10 Claims. (Cl. 198—52)

The invention relates to a device for supplying material in lump form, particularly non-round pieces or pieces incapable of rolling, to juxtaposed regions or points located in a horizontal plane. More particularly, the invention relates to such devices of the type comprising a body with a sloping plane, a feeder which supplies the material to the sloping plane, and one or more guide blades which guide the pieces, supplied thereto by the feeder, to the aforesaid juxtaposed regions, delivering them separately and successively beside each other.

One such device has been described in the copending application Serial No. 701,783, where it forms part of an apparatus for the dry separation, according to specific gravity, of objects differing in size and volume. The disclosure of that application is incorporated herein.

The present invention is also particularly adapted to be utilized in a similar apparatus, and more specifically for the purpose of supplying non-round pieces. The term "non-round pieces" is meant to comprehend pieces of material which, on acount of their shape, cannot roll but are capable of moving only by sliding.

In the known device of the aforesaid application, the body with the slanting plane consists of a conical plate which, together with blades connected to a rotating cylindrical wall, rotates in the same direction and at the same speed as the blades. The feeder in that device rotates at a higher speed, preferably several times faster than the blades, and in the same direction. The purpose of that arrangement was to increase the capacity of the device and to ensure that the pieces will be delivered one by one to juxaposed places, thus preventing them from interfering with one another as they continue to move through the apparatus.

Still referring to the device in the aforesaid application, the pieces, consisting for example of coal, mixed coal and shales, are flung with force from the feeder towards and against the blades. This causes severe wear of the blades, breakage and disintegration of the softer coal pieces, such pieces being most valuable, with the result that fine coal gets into the shale fraction and the yield is reduced. Moreover, this installation produces much noise by reason of its construction of operation.

Accordingly, it is an important objective of the present invention to provide a device where these drawbacks are overcome and which can be used not only in rotation-symmetrically devices but also in devices where the points to which the pieces are delivered are juxtaposed in a straight line, as described, for example, in the copening application Serial No. 669,818, the disclosure of which is hereby incorporated herein.

According to the present invention, the angle of inclination of the sloping plane with respect to the horizontal is larger than the angle of friction of the material to be handled on the material of the sloping plane, while the guide blade or blades is or are so positioned relative to the sloping plane that the line of intersection of the vertical plane through the lower edge of each guide blade and the said sloping plane defines at all points an angle of inclination with respect to the horizontal which is smaller than the said angle of friction; and means are provided whereby the blades and the sloping plane can be displaced relatively to one another. By "angle of friction of the material to be treated on the material of the sloping plane" is meant that angle between the said plane and the horizontal plane at which an object of the material to be treated overcomes the friction produced by the force of gravity and starts sliding. This angle depends on the coefficient of friction of the material to be handled on the material of the sloping plane. If the pieces to be handled consist of materials differing in coefficients of friction, the angle of inclination of the sloping plane shall at any rate be larger than the largest angle of friction of said materials and the angle of inclination of the line of intersection shall be smaller than the smallest angle of friction.

Under these conditions, it is preferred that a stationary and immobile feeder be used to supply the non-round pieces to the same location on the sloping plane. In a device where the sloping plane is defined by a conical body rotating around its axis of revolution and the guide blades—regularly spaced along the periphery of the said body—are likewise capable of rotating around said axis and have a curved shape with their convex part facing in the direction of rotation, while the regions or points to which the pieces are delivered are arranged in a circle having its center on said axis of rotation, the conical body can, according to the present invention, he rotated at a speed slower than that of the guide blades.

Devices embodying the invention allow the non-round pieces being handled to travel rectilinearly from a high point to a low point on the sloping plane. However, as soon as a piece strikes a guide blade it cannot slide downwards along the said blade because the slope of the line of intersection of the blade and the sloping plane is smaller than the angle of friction. A further downward movement is only possible when the piece loses its support owing to the displacement of the blade relative to the sloping plane and in the proper direction. Consequently, every piece will gradually slide down rectinearly from its feed point to the delivery point. On a conical body this movement will take place generally along the generatrices of the cone on which the pieces have been supplied from the feeder. Since the feeder is stationary and the conical body rotates each succeeding piece will be supplied from the feeder onto a different generatrix from the preceding one.

The speeds of revolution of the guide blades and the cone defining the sloping plane preferably are in the ratio of $(n+1)$ to $n$, respectively, where $n$ represents the number of blades. This ensures that each blade can deliver a continuous stream of pieces along the whole circumference of the cone without two pieces being delivered simultaneously on the same spot, while the apparatus is loaded to its maximum capacity.

As mentioned heretofore, devices according to the invention can also be used where the points to which the pieces must be delivered are juxtaposed in a straight line, rather than in a circle. In such devices, the body with the sloping plane may, according to the invention, comprise a straight flat plate whose upper end is near the delivery end of the feeder, while the guide blade or blades is or are defined by one or more straight plates set at an angle to the line along which the delivery points are arranged, the blade or blades being capable of reciprocating parallel to said line. In these devices, the feeder delivers the material in a direction perpendicular to the said line, and the construction and arrangement of the device are such that, irrespective of the position of the guide blade or blades, the non-round pieces will be prevented from freely travelling from the feeder to the delivery points. The feeder may be, for example, a trough or a screening plant.

In one embodiment of the invention, the guide blades are placed parallel to each other, and in one of the extreme positions of the reciprocating movement the upper ends of the outermost blades are substantially opposite the sides of the feeder, while in the other extreme position the upper end of one blade is opposite a side of the feeder. Two guide blades preferably are used in this embodiment.

In another embodiment, the blades diverge from a point near the upper end of the sloping plane, while the reciprocating movement of the said point extends between the two sides of the feeding device, the points to which the pieces are delivered being divided into two separated and spaced groups.

Further objects and advantages of the invention will be in part obvious and in part pointed out hereinafter.

The novel features of the invention may be best made clear from the following description and accompanying drawings in which.

Figure 1:
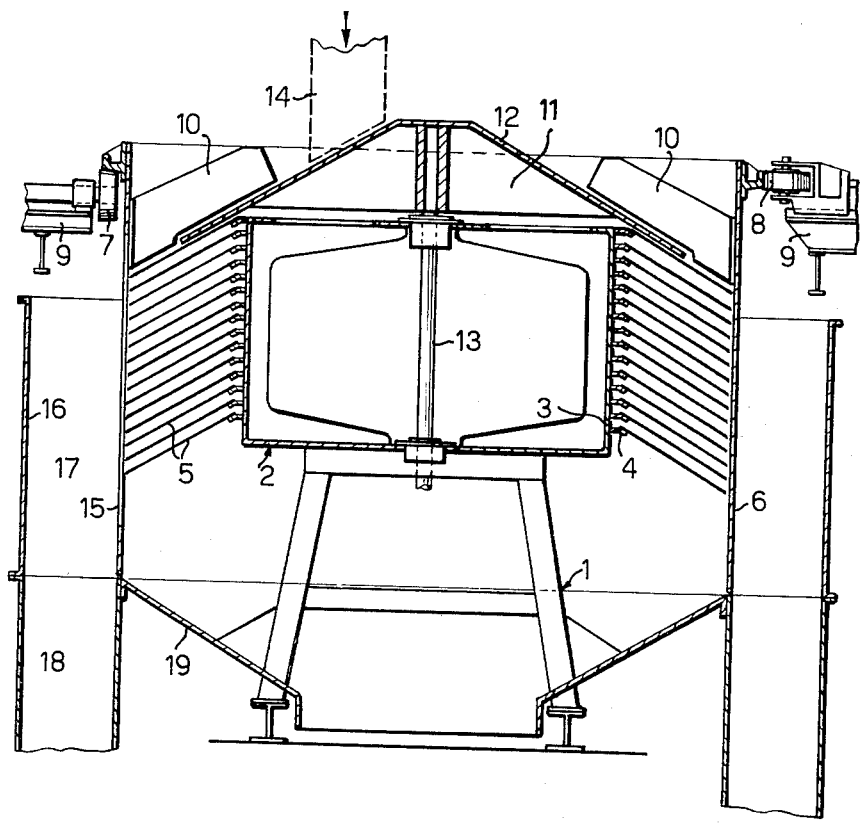
FIGURE 1 is a vertical sectional view of a device embodying the invention and used in an apparatus for the dry separation, according to specific gravity, of objects or pieces of material differing in size and volume.
Figure 2:
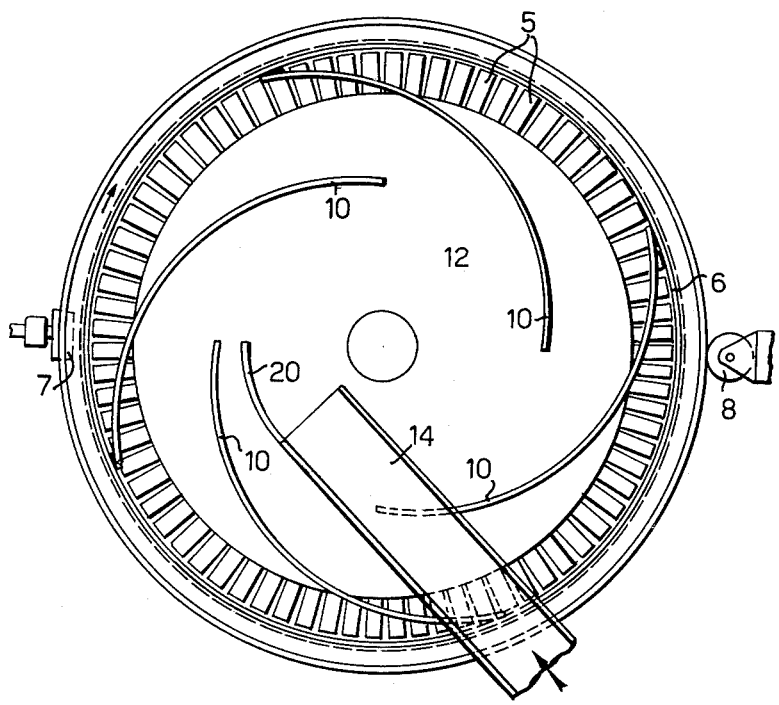
FIGURE 2 is a top plan view of the device shown in FIGURE 1.

In the apparatus shown in FIGURES 1 and 2, a cylindrical shell 2 is suitably mounted on a frame 1. Flat springs 5, placed beside and under one another, are fixed to the entire circumference of a wall 3 of the shell 2 by suitable means, such as supports 4. Arranged concentrically around the ends of the springs 5 is a cylindrical wall 6, mounted for rotation by means of a drive (not shown) engaging the circumference of this wall, in any conventional manner. The wall 6 is carried and guided by rollers 7 and 8 resting on supports 9, as shown.

Attached to the wall 6 adjacent and above the springs 5 are blades 10 (in this embodiment four), and a conical body 12 which, by means of radial plates 11, is fastened to a shaft 13 and can be rotated, by means of the shaft 13 and an appropriate driving mechanism therefore (not shown). The body 12 will be rotated in the same direction as the wall 6. The speed of rotation of the body 12 will be slower than that of the wall 6.

As indicated heretofore, a stationary feed trough 14 is disposed in proximity to the free ends of the blades 10, as shown, these blades being curved as indicated in FIGURE 2. The trough section 14 over the conical body 12 is slightly inclined, and is so shaped and positioned as to insure that the pieces of material are supplied on the conical body at a relatively low or negligible velocity. This can be achieved, for example, with a curved guide plate 20.

As indicated in FIGURE 2, the slope of the generatrices of the conical body 12 relative to the horizontal plane will depend on the material from which the said body is constructed and on the pieces of material supplied, and, as mentioned heretofore, it is at least so great that all pieces can slide down along the sloping conical surface of body 12. In an exemplary situation wherein the body 12 consists of steel plate and the material supplied consists of raw coal and shales, the angle of inclination made between the conical body and the horizontal, for example, at the lower left or right hand end of the conical body 12 as shown in FIGURE 1, shall be preferably between 30 and 35°.

The wall 6 is shown as being provided with openings 15 which, viewed in the direction of rotation, (see arrow in FIGURE 2 adjacent roller 7), are arranged at the rear of the points where the blades 10 are attached to the wall 6 so as to allow pieces with a specific gravity lower than the specific gravity of separation (as determined by the springs 5) that have been retained between the springs 5 and the wall 6 to pass through these openings and be delivered into a space 17 defined by the cylindrical shell 16 and the wall 6, from which they are carried away through a trough 18. The pieces that have been allowed to pass through the springs 5 are collected in a hopper 19.

The blades 10 have such a curvature that the angle included between their line of intersection with the cone 12 and the horizontal plane is smaller than the angle of friction of the pieces with the smallest coefficient of friction, whereby none of the pieces can slide along the blades to the circumference under the influence of gravity. For raw coal and shales this angle will be about 15°.

Figure 3:
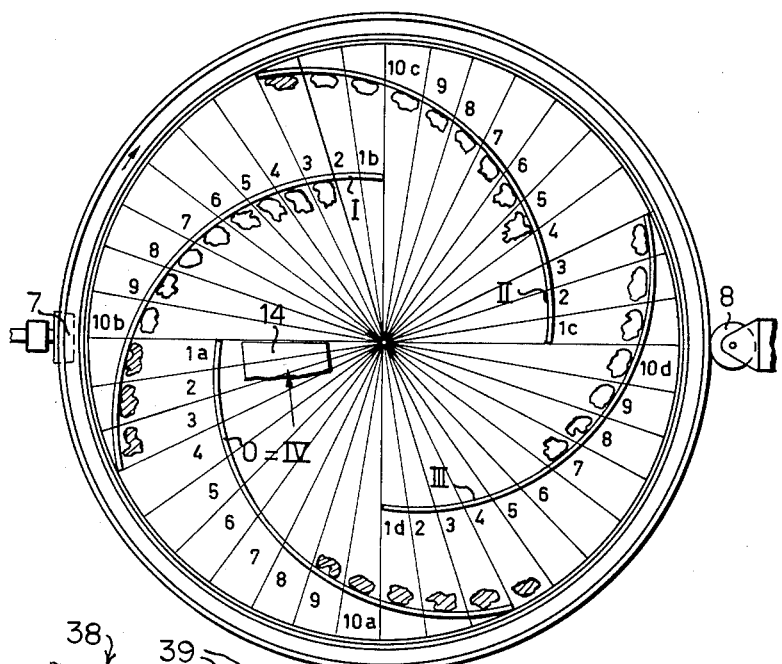
FIGURE 3 is a view corresponding to FIGURE 2 and showing schematically pieces of the material being handled.

The ratio between the velocities of rotation of the blades and that of the cone is $(n+1):n$, $n$ being the number of blades. The advantage of this feature is demonstrated in FIGURE 3, wherein one blade is shown in four positions identified as 0, I, II, III, IV of a complete revolution (position IV also corresponding to position 0, as should be evident). Each of the four quadrants of the conical surface is divided into equally large sectors $1a$–$10a$, $1b$–$10b$, $1c$–$10c$ and $1d$–$10d$. A non-round object or piece supplied onto the conical surface 12 at 14 will, under the influence of gravity, slide down substantially along the generatrix of the said surface onto which it has been supplied, until it is arrested by one of the blades 10. If the blades should rotate at the same speed as the conical surface, this object or piece would not move relatively to the conical surface and the blade. However, as the blade rotates faster than the conical plane the support is, as it were, drawn from under the said object and the latter gradually moves down substantially along the generatrix on which it is lying and travels relatively to the blade and towards the wall to which the said blade is attached. When the blade is in position 0, the first object will arrive in sector $1a$ and the following objects in the subsequent sectors. If the blade and the cone should rotate at the same velocity, all ten sectors would thus be occupied by objects when the blade has passed through one quarter of a revolution.

If the cone is assumed to make four revolutions per minute, the blades will make five according to the ratio given above. By virtue of this arrangement, no more than eight sectors of the quadrant covered by a blade are occupied and the pieces move relatively to the blade.

Consequently, when position I has been reached, the sectors $1b$ and $2b$ will be empty and the sectors $3b$–$10b$ occupied by newly arrived pieces. These newly arrived pieces are indicated by non-shaded figures.

On arriving in position II, the sectors $1c$–$4c$ are empty, whereas the six sectors $5c$–$10c$, as well as the sectors $1b$ and $2b$ of the adjoining quadrant, are occupied with pieces. In position III the sectors $1d$–$6d$ are empty and the sectors $7d$–$10d$ and $1c$–$3c$ occupied—all in all seven sectors—so that of the pieces supplied at inlet 14 one sector has been discharged during the travel from position II to position III. In position IV, which is the same as the initial position 0, the sectors $1a$–$8a$ are empty, and the sectors $9a$ and $10a$ and $1d$–$3d$ occupied, so that three sectors have been discharged now. In this position, the blade starts receiving new pieces. The pieces still present on the blade have been shaded so as to distinguish them from the newly-arrived pieces.

It will be seen that at the transition from position 0 to position I, three sectors, namely $1a$–$3a$, are still occupied with old pieces and the adjoining sectors $3b$–$10b$ with newly-arrived pieces; while in position II only sector $3b$ is still occupied with an old piece. From this, it should be evident that the apparatus according to the invention delivers the pieces in a continuous flow successively one after the other, along the circumference of body 12, so that the operated installation will be equally loaded to its maximum capacity. It is essential that every blade covers such a portion of the conical surface area that not a single piece can move directly from the feeding point at 14 to the outer circumference of body 12 without contacting one of the blades 10.

Figure 4:
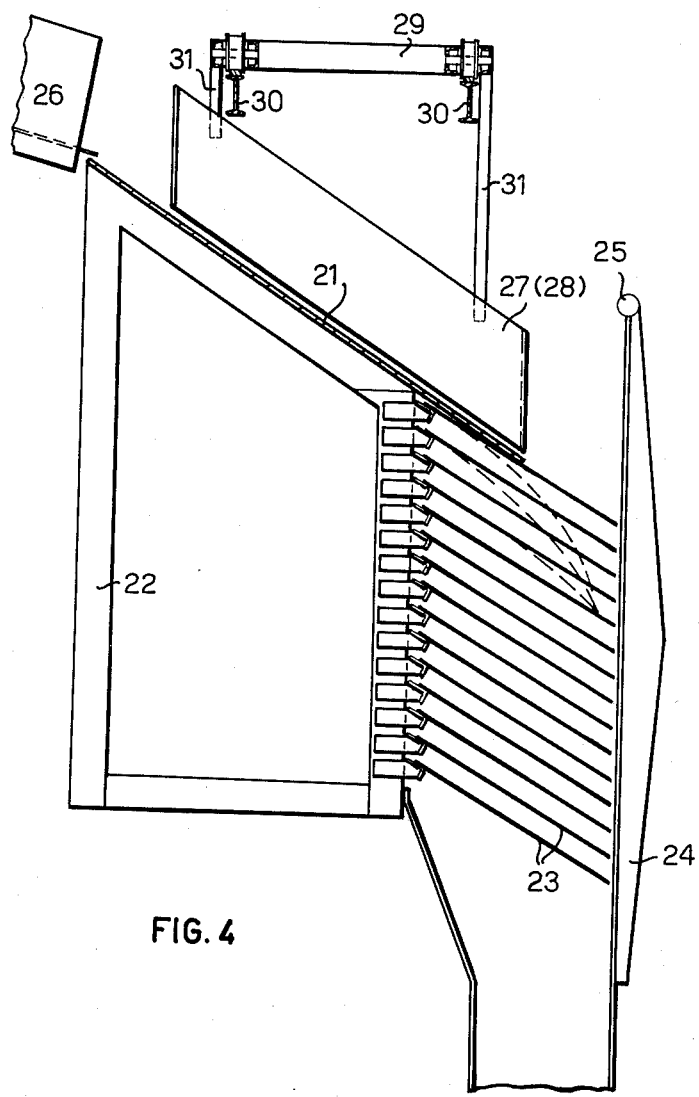
FIGURE 4 is a vertical sectional view of another embodiment of the invention.
Figure 5:
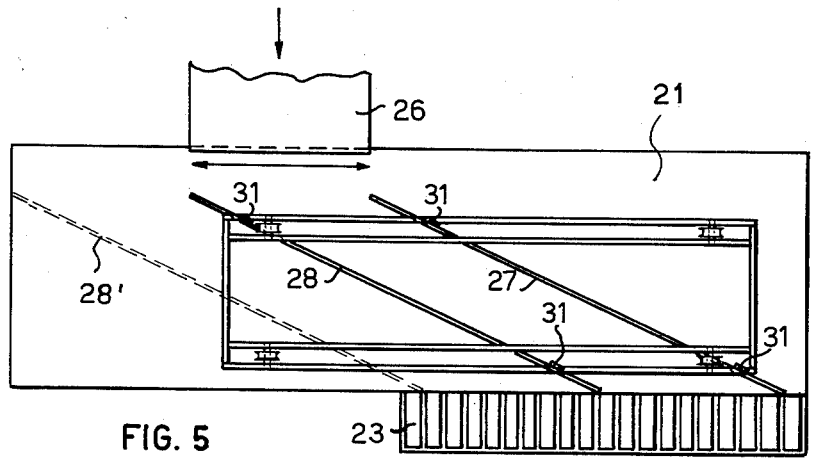
FIGURE 5 is a top plan view of the device shown in FIGURE 4.
Figure 6:
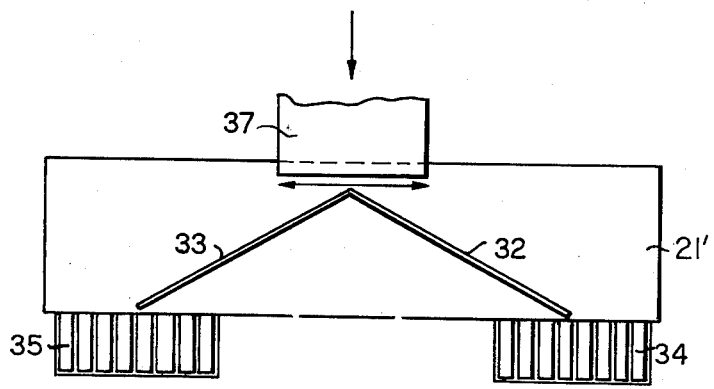
FIGURE 6 is a schematic top plan view of a modification of the embodiment shown in FIGURES 4 and 5.

The further embodiments illustrated in FIGURES 4, 5 and 6 are particularly suitable for those cases where the separating device, equipped with the feeder, has to handle large pieces or objects. A separator for handling pieces up to a given maximum size has a given maximum capacity, as will be appreciated. The mass of the pieces is proportional to the volume, i.e. proportional to the third power of one dimension or the product of more than one dimension. As the number of pieces to be delivered beside each other is proportional to the dimension of the pieces parallel to the circular circumference of the apparatus, the capacity of a given rotation-symmetrical apparatus will be proportional to the square of the volume. For handling large pieces, however, longer springs will be needed, so that the surface area is enlarged to an extent which is approximately proportional to the dimensions of the pieces, with the result that to enable the pieces to be handled on a circular bed, a bed is obtained whose capacity is the third power of that of a bed of the same dimensions but used for smaller pieces. The feed rate of such pieces is usually not high enough to make such a capacity necessary. Moreover, a circular bed with long springs has the drawback that the ends of the springs are too far apart, which impairs proper separation. For this reason, it is more advantageous to construct a bed in which the springs are arranged parallel to each other, as illustrated in FIGURES 4–6. Here the sloping plane is formed by a flat rectangular plate 21 mounted on a frame 22 at an angle of about 33° with the horizontal. The plate terminates at its lower end over a bed of parallel groups of flat springs 23 arranged one above another and being attached on one end to the frame 22. Opposite the free ends of the springs are flaps 24 which can be rotated around a shaft 25. The feeder 26, which may consist of a slightly inclined vibrating trough or a screen, discharges near the top end of the plate 21. Blades 27 and 28, which can be reciprocated parallel to the upper and lower edges of the plate, are attached, by means of rods 31, to a trolley 29 moving along track 30, as indicated.

The blades 27, 28 consist of straight plates set at such an angle to the upper and lower edges of the plate 21 that the lines of intersection of the planes of said blades with the sloping plane of plate 21 define an angle of about 15° with the horizontal. The plates 27 and 28 are placed parallel to each other, as shown, the distance between them being such that in one extreme position of the horizontal stroke their upper ends are exactly, or nearly exactly, opposite the ends of the lateral edges of the feeder 26, as indicated in FIGURE 6. The length of the stroke is preferably equal to the width of the feeder whereby blade 28 will move between the solid line position thereof and the dotted line position thereof indicated by numeral 28', in FIGURE 5.

An appropriate operating mechanism (not shown) rotates the flaps 24 around shaft 25 in correspondence with the movement of the blades 27 and 28 so as to allow the pieces arrested by the springs to pass outwardly.

As illustrated in FIGURE 5, the plates 27 and 28 are in the rightmost position. The pieces supplied by the feeder 26 now slide down rectilinearly along the plate 21 until they are arrested by the plate 28. During the leftward stroke the pieces lose their support and slide further down, until at a lower point, they are arrested again by the plate 28. During this stroke additional pieces slide from the feeder until they come to rest against the plate 27. During the rightward stroke all pieces resting against the plates 27 and 28 are wiped horizontally to the right, to continue their downward travel only during the next leftward stroke, until they arrive on the springs 23. During the rightward stroke the pieces that have been delivered on the springs 23 during the leftward stroke get the opportunity to be graded according to their specific gravity.

An apparatus of this type can operate without many errors, only if the pieces are not supplied in an uninterrupted flow. However, this is not the case with the large pieces to be handled in a coal or ore washery. By way of example it may be stated that for separating pieces of 280–500 mm. in diameter, a separator measuring 4 m. in length may be used in combination with a feeder having a width of 2 m. The pieces in the feeder are so far apart that there is no danger of two pieces being delivered simultaneously on the same springs.

With this device it is possible to use only one guide blade. In the embodiment shown in FIGURE 5, this blade will then be blade 28, the rightward stroke of which terminates opposite the left-hand edge of the feeder 26, as shown. The length and position of the blade must be such that when the blade is in its leftmost position it will extend across the whole outlet of the feeder 26, so that no pieces can slide rectilinearly from the said feeder onto the springs.

In the embodiment shown in FIGURE 6, the reciprocating guide blades 32 and 33 have been diverged relatively to each other, as shown, and the sloping plane is identified by numeral 21'. The length of the reciprocating stroke again equals the width of the feeder 37 and the blades are shown roughly at the midpoint of their stroke. Each guide blade covers a separator 34 or 35 of substantially the same width as the feeder. The space between the separators may be used for accommodating the discharging equipment for the separated fractions (not shown here).

Figure 7:
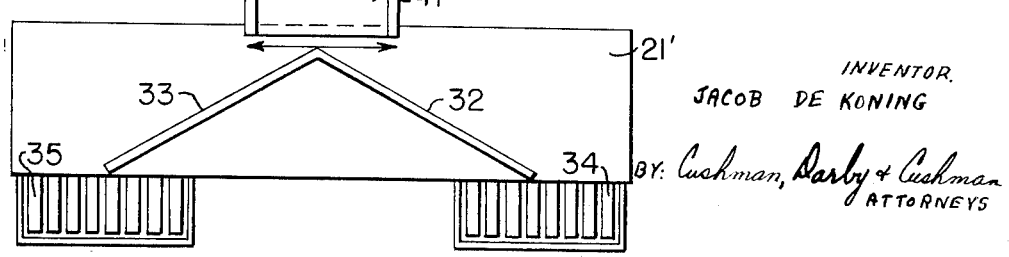
FIGURE 7 is a schematic top plan view of the device as shown in FIGURE 6 with a further modification according to the invention.

FIGURE 7 illustrates the case where the feeding means is defined by a screen. As shown, the feed means comprise the screen 38, formed by parallel bars 39, the screen debouching upon tapering trough 41.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. A device for supplying material in lump form, particularly non-round pieces, irrespective of the specific gravity thereof, to juxtaposed regions located in a horizontal plane, said device comprising: a body having a sloping surface; a feeding means for supplying material to said sloping surface; and at least one movable guide blade for guiding the pieces of material, supplied by said feeder, to said juxtaposed regions and for delivering them separately and successively beside each other; the angle of inclination of said sloping surface with the horizontal being of such magnitude in relation to the nature of the material to be handled and the material of said sloping surface that all the objects delivered onto said sloping surface can slide downwards along said surface; said guide blade being so positioned relative to said sloping surface that there is defined between said guide blade and said sloping surface a sloping path, said path at each point therealong having an angle of inclination of such magnitude that the material to be handled cannot slide down said path; and means for displacing said blade relative to said sloping surface to provide for downward sliding movement of said material along said sloping surface.

2. The structure defined in claim 1 wherein said feeding means is stationary and operates to deliver the pieces of material to the same location.

3. The structure defined in claim 1 wherein said sloping surface is defined by a conical body and further comprising: means for rotating said conical body about its axis of revolution; a plurality of guide blades similar to said first-named guide blade being provided together with said first guide blade at regularly spaced intervals above and adjacent to said body, all of said blades rotating in unison and in the same direction as said conical body, said blades being curved and having their convex sides facing in the direction of rotation; said juxtaposed regions being arranged in a circle having its center on said axis of revolution; and said conical body rotating at a lower velocity than said blades.

4. The structure defined in claim 3 wherein the velocities of rotation of said blades and said conical body are in the ratio of $(n+1)$ to $n$ respectively, wherein $n$ represents the number of blades.

5. The structure defined in claim 1 wherein said juxtaposed regions are disposed along a straight line, and further wherein said sloping surface is defined by a straight and inclined planar member having its upper end adjacent the delivery end of said feeding means, and said guide blade being defined by a straight plate inclined relative to the line along which said juxtaposed regions are disposed, said plate being reciprocable in a stroke parallel to said line, said feeding means delivering material in a direction substantially perpendicular to said line, and the construction and arrangement of said feeding means and said plate being such that irrespective of the position of said plate in its reciprocatory movement, it will operate to block the flow of material from said feeding means to said juxtaposed regions.

6. The structure defined in claim 5 wherein said feeding means comprises a trough.

7. The structure defined by claim 5 wherein said feeding means is defined by a screen.

8. The structure defined in claim 5 wherein another guide blade similar to said first-named guide blade is provided for reciprocation therewith, said blades being arranged in parallelism whereby in one of the extreme positions of the reciprocating movement thereof, the upper ends of the blades are substantially opposite the sides of said feeding means, while in the other extreme position the upper portion of one of said blades is disposed across said feeding means.

9. The structure defined in claim 5 wherein another guide blade is arranged with its upper end engaged to the upper end of said first-named guide blade, said blades diverging from said upper ends thereof and reciprocating together, with the path of travel of said upper ends extending across said feeding means, and further wherein said juxtaposed regions are divided into two separated groups.

10. Device according to claim 1 wherein said feeding means is operable to supply material on the sloping surface at a velocity of which at least the component in the direction of delivery is negligible.

References Cited in the file of this patent

UNITED STATES PATENTS 1,058,259    Pratt _____ Apr. 8, 1913